United States Patent
Mitchell

[11] 3,853,517
[45] Dec. 10, 1974

[54] DUST COLLECTOR
[75] Inventor: Wallace F. Mitchell, Arlington Heights, Ill.
[73] Assignee: Ammco Tools, Inc., North Chicago, Ill.
[22] Filed: Mar. 12, 1973
[21] Appl. No.: 340,324

[52] U.S. Cl............... 55/288, 15/352, 55/304, 55/334, 55/366, 55/374, 55/395, 55/459, 55/DIG. 3, 55/DIG. 6
[51] Int. Cl............................................. B01d 41/00
[58] Field of Search............. 55/DIG. 3, DIG. 6, 337, 55/429, DIG. 26, 288, 334, 378, 293, 366, 372, 392, 394, 395, 399, 428, 459, 304, 374; 15/327 R, 327 D, 352

[56] References Cited
UNITED STATES PATENTS
| | | | |
|---|---|---|---|
| 1,458,720 | 6/1923 | Malone | 55/337 UX |
| 2,295,984 | 9/1942 | Wilson | 55/288 |
| 2,892,511 | 6/1959 | Gall et al. | 55/DIG. 3 |
| 3,174,264 | 3/1965 | McKnab | 55/459 UX |
| 3,320,725 | 5/1967 | Foster | 55/293 X |
| 3,616,622 | 11/1971 | Friedman | 55/DIG. 6 X |

FOREIGN PATENTS OR APPLICATIONS
| | | | |
|---|---|---|---|
| 289,662 | 3/1953 | Switzerland | 55/337 |
| 24,832 | 10/1912 | Great Britain | 55/429 |

Primary Examiner—Frank W. Lutter
Assistant Examiner—Kathleen J. Prunner
Attorney, Agent, or Firm—Edmond T. Patnaude

[57] ABSTRACT

An inverted dust collecting bag has a plurality of weights including a magnetic member affixed thereto and a magnet mounted externally of the bag for operative engagement with the magnetic member when the bag is inflated and for temporarily holding the bag while the weights pendulum downwardly to wrinkle the bag before the bag drops from the magnet and falls abruptly to dislodge the dust particles collected therein.

2 Claims, 3 Drawing Figures

PATENTED DEC 10 1974　　3,853,517

DUST COLLECTOR

The present invention relates in general to dust collectors of the type including a porous bag in which dust particles are trapped as dust laden air is forced into the bag, and it relates more particularly to a new and improved dust collector incorporating novel means for removing dust particles deposited on the inner surface of the bag.

BACKGROUND OF THE INVENTION

There is a serious need for an efficient dust collector for use with grinding and other industrial machinery which produce or handle fine particulate materials. Whether such collectors are of the pressure or vacuum type they commonly employ a fabric bag through which dust laden air is passed to trap the entrained particles on the inner surface of the bag. With certain types of dust the bag surface becomes coated with an almost solid cake which, long before the bag or associated container is filled with dust, decreases the efficiency of the dust collector system to the point where the fine particles are not collected but are transmitted to the surroundings creating a definite health hazard. Various means including vibratory bag shakers and reverse flow systems have been devised to clean filter bags and other filter surfaces by automatically dislodging the filter cake therefrom. Such prior art techniques have, however, required the use of large, cumbersome and usually expensive equipment not suitable for use with small dust collectors of the type commonly associated with individual machine tools or the like.

OBJECTS OF THIS INVENTION

Therefore, a principal object of the present invention is to provide a new and improved dust collector incorporating means for removing filter cake from the inner surface of a dust collecting bag.

Another object of this invention is to provide a new and improved method and means for removing fine particulate matter from the surface of a filter bag.

A further object of this invention is to provide a dust collecting system for periodic use, which system incorporates a filter bag cleaner which automatically cleans the filter bag at the end of each operating cycle.

SUMMARY OF THE INVENTION

The above and further objects may be realized in accordance with the present invention by sealably mounting a filter bag above an imperforate container and feeding the dust laden air into the space between the container and the bag to inflate the bag in an upward direction. In order to break up the filter cake deposited on the interior surface of the bag, a plurality of weights are affixed to the bag at spaced apart intermediate locations, and a magnet is mounted above the bag to coact with one of the weights when the bag is inflated thereafter to temporarily hold the bag in an upstanding condition when the air flow is interrupted. When the air flow ceases, the other weights thus fall and swing downwardly from the area on the bag held by the magnet thereby to wrinkle the bag and crack the filter cake. The magnet then releases the bag whereupon the weights and the entire bag fall abruptly against a grid through the openings of which the dust and cake fall from the bag into the container.

BRIEF DESCRIPTION OF THE DRAWINGS

Further objects and advantages and a better understanding of the present invention may be had by reference to the following detailed description taken in connection with the accompanying drawings, wherein.

DETAILED DESCRIPTION OF THE DRAWINGS

Figure 2:
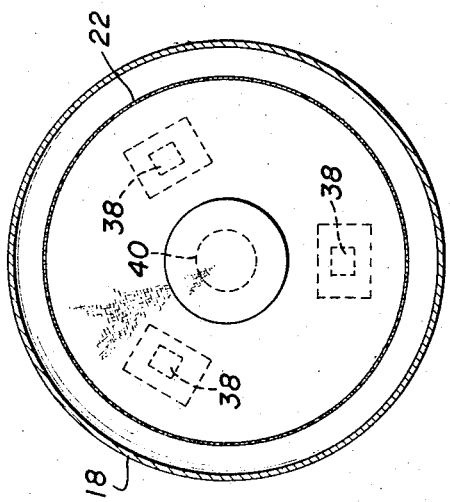
FIG. 2 is a cross sectional view of the dust collector of FIG. 1 taken along the line 2—2 thereof.
Figure 3:
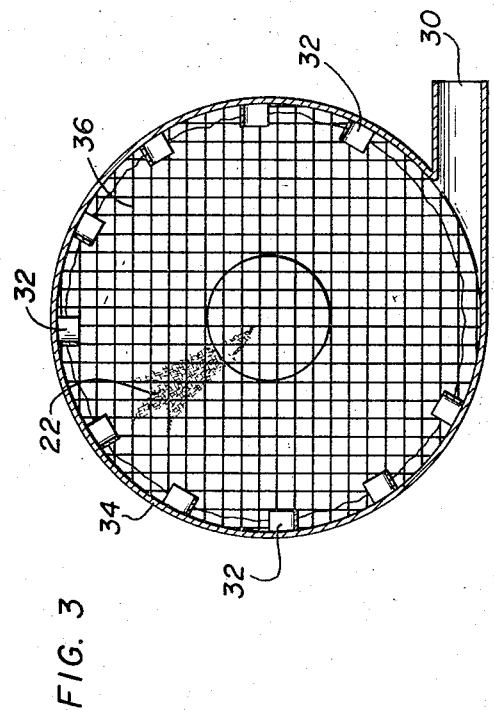
FIG. 3 is another cross sectional view of the dust collector of FIG. 1 taken along the line 3—3 thereof.
Figure 1:
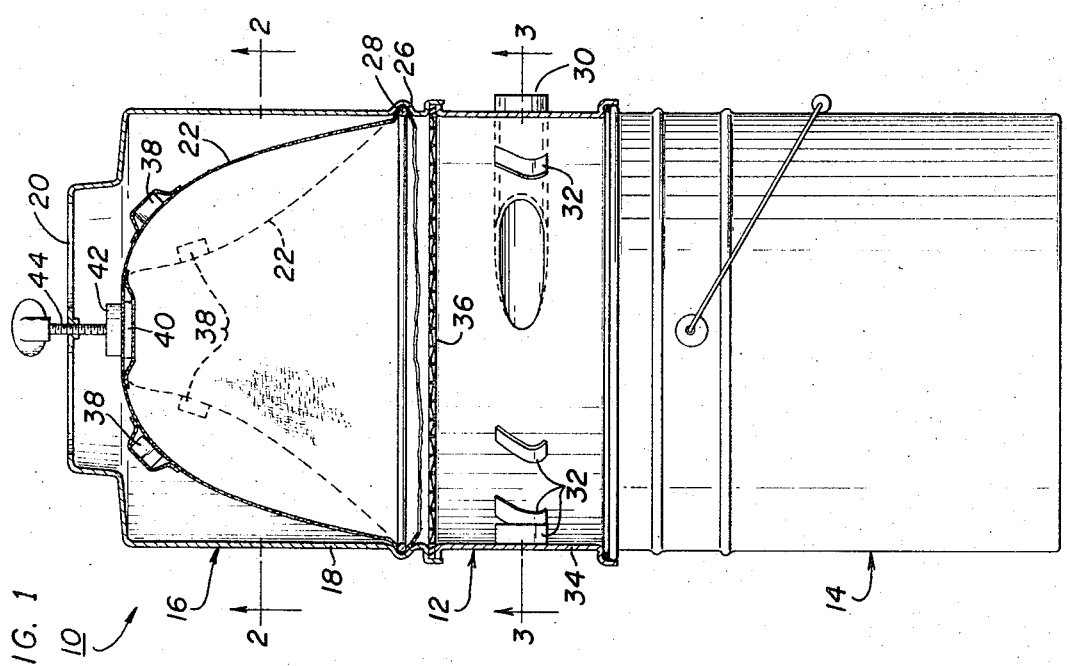
FIG. 1 is a partially sectioned dust collector embodying the present invention.

Referring to FIG. 1, a dust collector 10 comprises an air inlet and distributor unit 12 removably mounted over the open top of a container 14, and a filter unit 16 mounted on the unit 12. The container 14 may be a conventional five gallon pail of the type commonly found in garages and machine shops whereby only the units 12 and 16 need be marketed. The filter unit 16 includes a housing 18 having a plurality of air outlet ports 20 at the top and containing a fabric filter bag 22. The rim of the filter bag is sealably held in place in an annular groove 26 near the bottom of the housing 18 by a spring ring 28.

An air inlet duct 30 opens tangentially into the unit 12 and a plurality of baffles 32 extend inwardly from the inner wall of the annular air inlet housing 34 to act as a cyclonic dam to prevent the formation of a vortex within the dust collector. The baffles 32 direct the incoming air in a downward direction toward the container 14 where the dust or other entrained particles are collected. Air seals are provided between the top of the container 14 and the bottom of the air inlet section 12 and between the rim of the housing 18 and the top rim of the housing 34 whereby all of the air entering the collector 10 must exit through the filter bag 22 and the outlet ports 20. The inlet air pressure thus inflates the bag 22 into an inverted condition as shown in FIG. 1 and dust and other particulate matter entrained in the incoming air is trapped on the inner surface of the bag 22. When the supply of inlet air is interrupted, the bag 22 drops down against a rigid screen or grid 36 mounted across the top of the air inlet housing 34.

As thus far described, the dust collector 10 functions satisfactorily with some types of particulate matter. Where, however, a heavy tenacious filter cake is deposited on the bag surface, the cake remains on the bag when the air flow is interrupted thereby impairing the efficiency of the dust collector.

In order to break up the filter cake and cause it to fall from the bag 22 each time the air flow into the collector is terminated, a plurality of weights 38 are fastened to the bag near the top thereof. A weight 40 in the form of a plate of magnetic material such as steel is fastened to the top center of the bag and a permanent magnet 42 is mounted to the housing 18 for coaction with the weight 40 when the bag 22 is inflated. As shown, the magnet 42 is mounted for adjustable vertical movement on a screw 44 threadedly received in a central opening at the top of the housing 18.

OPERATION

Air in which particulate matter is entrained is supplied under pressure to the inlet 30 from which it enters the air inlet and distributor section 12. The heavier particles settle into the container 14 and the lighter particles are carried upwardly into the bag 22 where they are deposited on the inner surface thereof. Under the incoming air pressure the bag 18 is inflated whereby it moves into the position illustrated in solid lines in FIG. 1 with the plate 40 in effective engagement with the magnet 42. When the air flow is interrupted, the weights 38 swing downwardly under the plate 40 as illustrated in dotted lines in FIG. 1 to wrinkle the bag 22 and crack any filter cake adhering to the inner surface thereof. By properly selecting the strength of the magnet 42, the combined weight of the weights 38 and the bag 22 is sufficient to overcome the force of attraction between the magnet 42 and the plate 40 so that after the weights 38 swing down under the plate 40 the plate 40 separates from the magnet 42 and the entire bag abruptly drops down onto the screen 36 causing the particulate matter contained therein to fall into the container 14. The weights 38 are located closer to the plate 40 than to the rim of the bag so that they cannot be supported by the screen 36 while the plate 40 is held in the elevated position by the magnet 42. If desired, the magnet 42 may be fastened to the bag and the magnetic member 40 may be fastened to the screw 44 without changing the operation of the collector.

The present invention thus provides a new and improved dust collector suitable for use with individual machine tools or the like from which dust laden air is blown under pressure to the collector. Each time the air flow to the collector is interrupted the dust bag is wrinkled to crack the cake and then drops abruptly to cause the cake to drop into the container at the bottom. When filled with dust, the container is simply removed from the air inlet unit 12 and emptied.

While the present invention has been described in connection with a particular embodiment thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A dust collector, comprising
a container having an inlet opening at the top,
an air inlet section mounted to said container over said opening, and
a filter bag mounted above said air inlet section, means sealably securing said bag to said air inlet section,
a first magnetic member affixed to said bag,
a second magnetic member,
at least one of said magnetic members being a magnet,
means adjustably mounting said second magnetic member externally of said bag such that said first magnetic member is carried by said bag into proximity with said second magnetic member when said dust laden air flows into and inflates said bag,
one or more weights affixed to said bag in spaced apart relationship with said first member to be held by said bag in an elevated position when said bag is inflated,
the magnetic force of attraction between said first and second magnetic members being sufficient upon cessation of said air flow into said bag to hold said first member in proximity with said second member until said one or more weights falls by gravity to wrinkle said bag and then to permit said first member and said one or more weights to fall, whereby interruption of the air flow into said bag dislodges dust particles deposited on the inner surface of said bag.

2. A dust collector according to claim 1, wherein said first magnetic member is affixed to the top center of said bag, and
said second magnetic member is mounted above said bag,
a plurality of said weights being affixed to said bag around said first member.

* * * * *